United States Patent Office 2,820,808
Patented Jan. 21, 1958

2,820,808

ORGANIC ESTERS OF SULFUROUS ACID

Walter D. Harris, Naugatuck, and John W. Zukel, Hamden, Conn., assignors to United States Rubber Company, New York, N. Y., a corporation of New Jersey No Drawing. Application May 7, 1954
Serial No. 428,370

8 Claims. (Cl. 260—456)

This invention relates to new organic esters of sulfurous acid, more particularly to mixed sulfite esters of aliphatic alcohols and monoaromatic ethers of polyalkylene glycols.

The new compounds of the present invention are useful as insecticides, particularly for the control of mites. They may also be used as plasticizers and oil additives.

The chemicals of the present invention may be represented by the general formula

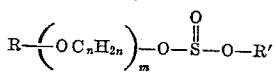

in which R' is an aliphatic radical, e. g. alkyl, haloalkyl, cyanoalkyl or alkenyl radical, and R is an aromatic radical, e. g. phenyl, or naphthyl, or a phenyl or a naphthyl radical having one or more substituents in the aryl nucleus selected from the group consisting of alkyl, cycloalkyl, haloalkyl, alkoxy, nitro and halo, and $m$ is 2 to 5, and $n$ is 2 to 4. Examples of R' are methyl, ethyl, n-propyl, isopropyl, n-butyl, isobutyl, sec. butyl, n-amyl, n-hexyl, cyclohexyl, octyl, capryl, 2-ethyl hexyl, decyl, dodecyl, 2-chloroethyl, 2-cyanoethyl, 2,2,2-trichloroethyl, γ-chloropropyl, ω-chlorobutyl, ω-trichloroamyl, allyl, methallyl. Examples of R are phenyl, 1-naphthyl, 2-naphthyl, p-tolyl, o-tolyl, chlorophenyl, isopropylphenyl, tert-butylphenyl, tert-amyl phenyl, cyclohexyl phenyl, chloromethylphenyl, methoxyphenyl, nitrophenyl, bromophenyl, 2,4-dichlorophenyl, 2,4,6-trichlorophenyl, 2,4,5-trichlorophenyl, pentachlorophenyl. Examples of the —$C_nH_{2n}O$— group are ethyleneoxy, trimethyleneoxy, tetramethyleneoxy, propyleneoxy, 1,2-dimethyl ethyleneoxy.

The preparation of the chemicals of the invention is carried out by reacting the selected aliphatic chlorosulfinate with the selected polyalkyleneglycol monoaromatic ether, these chemicals being separately prepared. The intermediate aliphatic chlorosulfinate may be made by reacting the selected aliphatic alcohol or alkylene oxide with thionyl chloride. The intermediate polyalkyleneglycol monoaromatic ether may be made by reacting the selected phenol with two or more mols of the selected alkylene oxide per mol of the phenol. Such preparation is illustrated by the following reactions with the same symbols R, R', and $m$ as in the above general formula and using the polyethylene glycol series ($n=2$) as an example:

(1)  R'OH + SOCl₂ ⟶ R'OSCl + HCl (with =O on S)

(2) 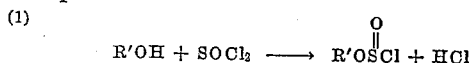

(3) 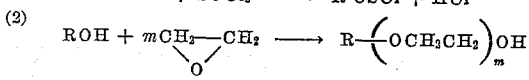

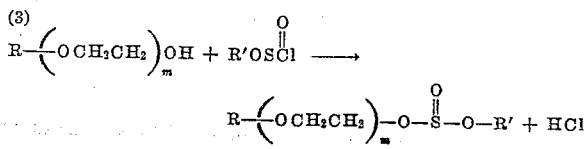

The products obtained in the first reaction are sufficiently stable that they can be distilled under reduced pressure and stored for a short period with only slight decomposition. The second reaction is a well known reaction used widely in the preparation of many non-ionic surface-active agents. It is a smooth reaction but gives a mixture of products having varying numbers of alkylene oxide units. If a specific number of alkylene-oxide units is desired, it is necessary to fractionate the mixture. In the present invention, it is satisfactory to have mixtures of compounds with varying alkylene oxide units from 2 to 5. The third reaction is conveniently carried out in the presence of a proton acceptor, such as pyridine, dimethyl aniline, or trimethylamine, to sequester the hydrogen chloride, and in a solvent such as benzene, xylene or solvent naphtha. A wide variation in temperature is possible, but temperatures between 0° C. and 50° C. are most convenient.

As an illustration of the preparation of the compounds of the present invention, Example I describes the preparation of a series of mono-p-tert.-butyl phenyl ethers of polypropylene glycol and 2-chloroethyl 2-p-tert.-butyl-phenoxyisopropyloxyisopropyl sulfite (the diester of 2-chloroethanol and the mono-p-tert.-butylphenyl ether of dipropylene glycol).

Example I

The polypropyleneglycol mono-p-tert.-butyl phenyl ethers were prepared as follows: p-tert.-butylphenol (600 g.=4.0. mols) was heated to melting in a 2-liter, 3-necked flask equipped with a mercury sealed stirrer, a thermometer, an addition funnel and a Dry Ice-acetone condenser. Sodium hydroxide (8 g.) was added and the temperature was raised to 150° C. Propylene oxide (929 g.=16 mols) was added in 50 ml. increments over a period of seven and one-half hours. The temperature was increased gradually from 154° C. to 225° C. during this period. Heating was continued at 170° C. until refluxing ceased. After the solution had cooled to room temperature enough concentrated hydrochloric acid (20.8 g. in 150 ml. of water) to neutralize the sodium hydroxide catalyst was added. The aqueous layer was removed and the organic layer was washed once with 500 ml. of saturated salt solution. The volatile fraction was removed by distilling the fraction boiling up to 54° C./24 mm. The product was filtered through a layer of "Dicalite" (a diatomaceous earth filter aid) to remove solid impurities. The resulting clear reaction mixture was then fractionated through a glass helix packed heated column. The physical constants for the fractions corresponding to the mono-p-tert.-butyl phenyl ethers of di-, tri-, tetra-, and pentapropylene glycols are shown below:

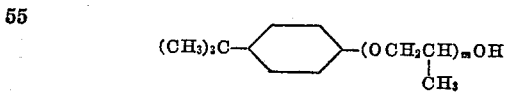

| $m$ | Boiling range, °C. | Pressure, mm. | Sp. gr., 20° C. | $n_D^{20}$ | Hydroxyl No. Found | Hydroxyl No. Theory |
|---|---|---|---|---|---|---|
| 2 | 121–137 | 0.15–0.45 | 0.9924 | 1.4968 | 213.4 | 212 |
| 3 | 153–168 | 0.2 –0.6 | 0.9929 | 1.4888 | 172.2 | 173 |
| 4 | 181–196 | 0.2 –0.4 | 0.9970 | 1.4819 | 162.9 | 147 |
| 5 | 198–222 | 0.25–0.65 | 0.9967 | 1.4752 | 133.6 | 125 |

2-chloroethyl chlorosulfinate was prepared as follows: Thionyl chloride (70 g.) was added to ethylene chlorohydrin (40 g.) at such a rate that the temperature did not rise above 35° C. Hydrogen chloride was evolved rapidly. The mixture was allowed to stand for two days protected from the moisture of the air by a calcium chloride tube. The reaction mixture was fractionally distilled, yielding 72 g. of 2-chloroethyl chlorosulfinate, a water-white liquid which boiled at 90–94° C./30 mm.

The 2-chloroethyl sulfite of dipropyleneglycol mono-p-tert.-butyl phenyl ether was prepared as follows: 2-chloroethyl chlorosulfinate (37.3 g.–0.23 mol) was added rapidly to a well stirred solution of dipropyleneglycol mono-p-tert.-butylphenyl ether (53.27 g.–0.20 mol), and pyridine (18.3 g.–0.23 mol) in solvent naphtha (150 ml.) cooled in a cold water bath. Addition was at such a rate (five minutes) that the temperature did not rise above 20° C. Stirring was continued for an additional fifteen minutes. The reaction mixture was then washed twice with 50 ml. quantities of water, then for one hour with 2 N NaOH (200 ml.). Several washes with 50 ml. portions of saturated salt solution reduced the pH of the aqueous layer to 7. The solvent was separated by vacuum distillation to 146° C./pot temperature. After filtering the product (76.8 g.–97.8%) through "Dicalite," it was a light yellow, slightly viscous liquid.

The physical constants of the thus prepared 2-chloroethyl 2-p-tert.-butylphenoxyisopropyloxyisopropyl sulfite, and of the diisopropyloxy and triisopropyloxy and tetraisopropyloxy analogues similarly prepared from the mono-p-tert.-butyl phenyl ethers of the tri-, tetra- and pentapropyleneglycols above are shown in the following table:

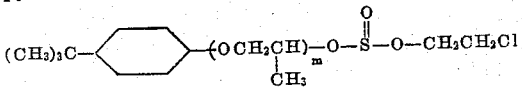

| m | Sp. gr., 20° C. | $n_D^{20}$ | Percent Cl Found | Percent Cl Theory |
|---|---|---|---|---|
| 2 | 1.1360 | 1.5022 | 8.97 | 9.03 |
| 3 | 1.1186 | 1.4952 | 7.81 | 7.86 |
| 4 | 1.1060 | 1.4870 | 7.13 | 6.99 |
| 5 | 1.0784 | 1.4820 | 5.4 | 6.26 |

Example II

Reacting other combinations of phenols and alkylene oxides in the desired mol ratios to give various polyalkyleneglycol monoaromatic ethers and reacting the ethers with the selected aliphatic chlorosulfinate in a manner similarly to Example I, gave various other examples of compounds according to the present invention having the physical constants shown in the following table:

| | Structure | Sp. gr., 20° C. | $n_D^{20}$ | Analyses Found | Analyses Theory |
|---|---|---|---|---|---|
| I | $CH_3OSO(CHCH_2O)_2\text{-}C_6H_4\text{-}C(CH_3)_3$, with CH$_3$ branch | 1.0764 | 1.5021 | 7.85% S | 9.30% S |
| II | $CH_3CH_2CH_2OSO(CHCH_2O)_2\text{-}C_6H_4\text{-}C(CH_3)_3$, with CH$_3$ branch | 1.0583 | 1.4917 | 8.7% S | 8.6% S |
| III | $C_{11}H_{21}OSO(CHCH_2O)_2\text{-}C_6H_4\text{-}C(CH_3)_3$, with CH$_3$ branch | 0.9956 | 1.4867 | 5.4% S | 6.82% S |
| IV | $C_2H_5OCCH_2OSO(CHCH_2O)_2\text{-}C_6H_4\text{-}C(CH_3)_3$, with CH$_3$ branch | 1.0817 | 1.4978 | 6.2% S | 7.7% S |
| V | $ClCH_2CH_2OSO(CHCH_2O)_2\text{-}C_6H_4\text{-}CH_3$, with CH$_3$ branch | 1.1587 | 1.4969 | 8.73% Cl | 10.1% Cl |
| VI | $ClCH_2CH_2OSO(CHCH_2O)_2\text{-}C_6H_4\text{-}Cl$, with CH$_3$ branch | 1.2322 | 1.5058 | 7.62% Cl | 8.6% Cl |
| VII | $ClCH_2CH_2OSO(CHCH_2O)_2\text{-}C_6H_3(Cl)\text{-}Cl$, with CH$_3$ branch | 1.3543 | 1.5309 | 27.9% Cl | 26.3% Cl |
| VIII | $ClC_2H_4OSO(CHCH_2O)_2\text{-}C_6H_4\text{-}C(CH_3)_3$, with CH$_3$ branch | 1.1063 | 1.4980 | 8.16% Cl | 9.03% Cl |
| IX | $ClCH_2CHClCH_2OSO(CH_2CH_2O)_2\text{-}C_6H_5$ | 1.3162 | 1.5261 | 18.85% Cl | 19.9% Cl |

The intermediate chlorosulfinates in compounds I, II, III, IV, VIII and IX were prepared by the reaction of thionyl chloride with methanol, propanol, decanol, ethyl glycolate, propylene oxide and technical 2,3-dichloro-1-propanol, respectively. The intermediate polyalkyleneglycol monoaromatic ether in compound IX was prepared by reacting phenol with ethylene oxide. The intermediate polyalkyleneglycol monoaromatic ethers in compounds V, VI and VII were prepared by reacting propylene oxide with p-cresol, p-chlorophenol, and 2,4-dichlorophenol, respectively.

Example III

Examples of further diesters of the present invention illustrating further variations in the esterifying groups are:

Methyl phenoxyethoxyethyl sulfite
Ethyl phenoxyethoxyethyl sulfite
Amyl phenoxyethoxyethyl sulfite
2-chloroethyl phenoxyethoxyethyl sulfite
2-bromethyl phenoxyethoxyethyl sulfite
2-cyanoethyl phenoxyethoxyethyl sulfite
Allyl phenoxyethoxyethyl sulfite
Methallyl phenoxyethoxyethyl sulfite
2-chloroethyl phenoxydiethoxyethyl sulfite
2-chloroethyl phenoxytetraethoxyethyl sulfite
2-chloroethyl o-toloxyisopropoxyisopropyl sulfite
2-chloroethyl o-toloxydiisopropoxyisopropyl sulfite
2-chloroethyl o-toloxytriisopropoxy isopropyl sulfite
2-chloroethyl p-chlorophenoxyethoxyethyl sulfite
2-chloroethyl 2,4,5-trichlorophenoxyethoxy ethyl sulfite
2-chloroethyl 2,4-dichlorophenoxyethoxyethyl sulfite
Methyl 2,4-dichlorophenoxyethoxyethyl sulfite
Ethyl 2,4-dichlorophenoxyethoxyethyl sulfite
n-Propyl 2,4-dichlorophenoxyethoxyethyl sulfite
n-Butyl 2,4-dichlorophenoxyethoxyethyl sulfite
n-Octyl 2,4-dichlorophenoxyethoxyethyl sulfite
n-Dodecyl 2,4-dichlorophenoxyethoxyethyl sulfite
3-Chloropropyl 2,4-dichlorophenoxyethoxyethyl sulfite
2-chloropropyl 2,4-dichlorophenoxyethoxyethyl sulfite
2,3-dichloropropyl 2,4-dichlorophenoxyethoxyethyl sulfite
2-chloroethyl cyclohexylphenoxyethoxyethyl sulfite
2-chloroethyl chloromethylphenyloxyethoxyethyl sulfite
2-chloroethyl methoxyphenoxyethoxyethyl sulfite
2-chloroethyl nitrophenoxyethoxyethyl sulfite
2-chloroethyl chlorophenoxyethoxyethyl sulfite

Example IV

The following illustrates the effectiveness of the chemicals of the present invention for controlling the two-spotted spider mite (*Tetranychus bimaculatis* Harvey).

Potted snap beans (Tendergreen variety) having two fully expanded leaves were used as the host plant. All growth except the two primary leaves were removed and the plants were thinned to two per pot. Rings of an adhesive preparation non-toxic to the organisms under test, such as is used on fly papers and for ringing trees, were placed around the outer edge of each of the leaves. Live mites were then transferred to the enclosed areas of the leaves and allowed to become acclimated for one day.

Emulsions of the chemicals were prepared by thoroughly mixing 1 gram of the test chemical with 100 grams of distilled water and three drops of a commercial surface-active dispersing agent comprising the reaction product of castor oil and ethylene oxide and known to be non-toxic at the concentrations used to the organisms under test. An aliquot was removed and diluted, usually tenfold each time, and this process was repeated to give the desired ranges of concentrations of the chemicals.

The mite infested bean plants after being acclimated for one day were rotated on a turn table and sprayed with a fine spray of the test chemicals at the various dilutions until the spray dripped freely. The thus treated plants were returned to the greenhouse and as soon as they were dry the adult mites within the enclosure were counted. After 72 hours, a second count was taken of live adult mites in the enclosed areas. Percent mortality was calculated according to the following formula:

Percent mortality =

$$\frac{\text{No. of mites at beginning} - \text{No. of live mites after 72 hours}}{\text{No. of mites at beginning}} \times 100$$

The results of this test for a group of representative compounds of the present invention are summarized in the table below.

| Compound | Concentration | Percent mortality in 72 hours |
|---|---|---|
| $ClCH_2CH_2OSO(CHCH_2O)_2\text{-}C_6H_4\text{-}C(CH_3)_3$ (with $CH_3$ branch) | 1:1600 / 1:5000 | 100 / 100 |
| $ClCH_2CH_2OSO(CHCH_2O)_3\text{-}C_6H_4\text{-}C(CH_3)_3$ (with $CH_3$ branch) | 1:1600 / 1:5000 | 100 / 100 |
| $ClCH_2CH_2OSO(CHCH_2O)_4\text{-}C_6H_4\text{-}C(CH_3)_3$ (with $CH_3$ branch) | 1:1600 / 1:5000 | 100 / 100 |
| $ClCH_2CH_2OSO(CHCH_2O)_5\text{-}C_6H_4\text{-}C(CH_3)_3$ (with $CH_3$ branch) | 1:1600 / 1:5000 | 100 / 100 |
| $ClC_3H_6OSO(CHCH_2O)_2\text{-}C_6H_4\text{-}C(CH_3)_3$ (with $CH_3$ branch) | 1:1600 / 1:5000 | 100 / 100 |
| $C_2H_5OCCH_2OSO(CHCH_2O)_2\text{-}C_6H_4\text{-}C(CH_3)_3$ (with $CH_3$ branch) | 1:1600 / 1:5000 | 96 / 94 |
| $ClCH_2CH_2OSO(CHCH_2O)_2\text{-}C_6H_4\text{-}CH_3$ (with $CH_3$ branch) | 1:5000 / 1:50,000 | 100 / 57 |
| $ClCH_2CH_2OSO(CHCH_2O)_2\text{-}C_6H_4\text{-}Cl$ (with $CH_3$ branch) | 1:5000 / 1:50,000 | 99 / 77 |
| $ClCH_2CH_2OSO(CHCH_2O)_2\text{-}C_6H_3(Cl)\text{-}Cl$ (with $CH_3$ branch) | 1:5000 / 1:50,000 | 100 / 46 |

The chemicals of the present invention may be applied in various manners for the control of insects. They may be applied to loci to be protected against insects in undiluted form, or as dusts when admixed with or adsorbed on powdered solid carriers, such as the various mineral silicates, e. g., mica, talc, pyrophyllite and clays, or as liquids or sprays when in a liquid carrier, as in solution in a suitable solvent, or dispersed in a suitable non-solvent medium, for example, water. In protecting plants (the term including plant parts) which are subject to attack by insects, the chemicals of the present invention are preferably applied as aqueous emulsions containing a dispersing agent. The chemicals of the invention may be admixed with powdered solid carriers, such as mineral silicates, together with small amounts of a dispersing agent so that a wettable powder is obtained which may be applied directly to loci to be protected against insects, or which may be shaken up with water, to form a suspension of the chemical (and powdered carrier) in water for application in that form. The chemicals of the present invention may be applied to loci to be protected against insects by the aerosol method. Solutions for the aerosol treatment may be prepared by dissolving the chemical directly in the aerosol carrier which is liquid under pressure but which is a gas at ordinary temperature (e. g., 20° C.) and atmospheric pressure, or the aerosol solution may be prepared by first dissolving the chemical in a less volatile solvent and then admixing such solution with the highly volatile liquid aerosol carrier. The chemicals may be used admixed with carriers that are active of themselves, for example, other insecticides, fungicides or bactericides.

Having thus described our invention, what we claim and desire to protect by Letters Patent is:

1. A mixed sulfite diester of an aliphatic alcohol having 1 to 12 carbon atoms and a monoaromatic ether of a polyalkylene glycol in which the aromatic radical has 6 to 12 carbon atoms and in which the esterifying radical from the polyglycol contains 2 to 5 alkyleneoxide groups each having 2 to 4 carbon atoms.

2. A chemical represented by the general formula

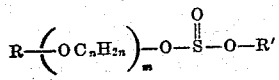

in which R' is selected from the group consisting of alkyl, haloalkyl, cyanoalkyl, and alkenyl radicals having 1 to 12 carbon atoms, R is selected from the group consisting of aryl, alkaryl, cycloalkylaryl, haloalkylaryl, alkoxyaryl, nitroaryl and haloaryl radicals having 6 to 12 carbon atoms, $m$ is 2 to 5, and $n$ is 2 to 4.

3. A 2-chloroethyl p-tert.-butylphenoxy - alkoxy - alkyl sulfite in which the alkoxy and alkyl groups each contain 2 to 4 carbon atoms.

4. A 2-chloroethyl p-tert.-butylphenoxy - poly - alkoxyalkyl sulfite containing 2 to 4 said alkoxy groups and in which the alkoxy and alkyl groups each contain 2 to 4 carbon atoms.

5. 2-chloroethyl 2-p-tert.-butylphenoxyisopropyloxyisopropyl sulfite.

6. 2-chloroethyl 2-p-tert.-butylphenoxydiisopropyloxyisopropyl sulfite.

7. 2-chloroethyl 2-p-tert.-butylphenoxytriisopropyloxyisopropyl sulfite.

8. 2 - chloroethyl 2-p-tert.-butylphenoxytetraisopropyloxyisopropyl sulfite.

References Cited in the file of this patent

UNITED STATES PATENTS

| | | |
|---|---|---|
| 1,970,578 | Schoeller et al. | Aug. 21, 1934 |
| 2,529,494 | Harris et al. | Nov. 14, 1950 |
| 2,644,008 | Glenn et al. | June 30, 1953 |